United States Patent [19]

Lehmacher

[11] 3,966,524
[45] June 29, 1976

[54] METHOD AND APPARATUS FOR MANUFACTURE OF PAD-STACKED BAGS

[76] Inventor: Hans Lehmacher, 5216 Niederkassel-Mondorf, Hummerich, Germany

[22] Filed: Aug. 17, 1972

[21] Appl. No.: 282,193

[30] Foreign Application Priority Data

| Aug. 17, 1971 | Germany | 2141045 |
| June 19, 1972 | Germany | 2229728 |
| July 7, 1972 | Germany | 2233408 |
| July 26, 1972 | Germany | 2236523 |

[52] U.S. Cl. ............... 156/182; 93/33 H; 93/35 R; 156/250; 156/253; 156/288; 156/290
[51] Int. Cl.² ............................................. B32B 31/00
[58] Field of Search .......... 156/182, 222, 250, 251, 156/252, 253, 288, 515, 512, 290; 221/175; 93/33 H, 35 R, 18, 19, 35 H, DIG. 1; 229/53, 56; 83/86, 88, 94; 206/57 A, 801, 526

[56] References Cited
UNITED STATES PATENTS

| 2,715,493 | 8/1955 | Vogt | 206/801 |
| 2,973,797 | 3/1961 | Sylvester | 156/251 |
| 3,021,947 | 2/1962 | Sylvester et al. | 156/253 |
| 3,033,257 | 5/1962 | Weber | 156/251 |
| 3,160,273 | 12/1964 | Reuther et al. | 156/253 |
| 3,210,908 | 10/1965 | Samberg | 53/182 |
| 3,351,215 | 11/1967 | Kitch | 93/33 |
| 3,352,411 | 11/1967 | Schwarzkopf | 206/801 |
| 3,363,826 | 1/1968 | Behler | 93/35 H |
| 3,399,096 | 8/1968 | Ranger | 93/35 R |
| 3,431,828 | 3/1969 | Crawford et al. | 93/93 HT |
| 3,533,331 | 10/1970 | Kugler | 93/33 |
| 3,568,576 | 3/1971 | Lehmacher et al. | 93/33 H |
| 3,587,410 | 6/1971 | Dechanciaux | 93/33 |
| 3,607,521 | 9/1971 | Suominen et al. | 93/33 H |
| 3,729,361 | 4/1973 | Westlake, Jr. | 93/33 H |

FOREIGN PATENTS OR APPLICATIONS

| 850,483 | 9/1970 | Canada |

*Primary Examiner*—Douglas J. Drummond
*Assistant Examiner*—David A. Simmons
*Attorney, Agent, or Firm*—P. D. Golrick

[57] ABSTRACT

Sections successively severed from a double layer web of synthetic thermoplastic film, e.g., flattened tube stock, as produced are each stacked and welded to a precedingly stacked section near one edge of a tear off pat or hanger portion to which a bag portion of the section is attached; forming ultimately a pad of bag sections, wherein each section includes either a completed bag or a partially completed bag, in the latter case with final bag producing operations carried out simultaneously for all bags already welded together in a pad structure.

40 Claims, 30 Drawing Figures

METHOD AND APPARATUS FOR MANUFACTURE OF PAD-STACKED BAGS

The present invention is concerned with a method for the manufacture of a pad of stacked bags, especially carrying bags or like packaging made of thermoplastic synthetic plastic film, and welded to one another into a pad from which individual bags may be torn off as at the time of use.

By certain known prior art methods and apparatus, thermoplastic film bags are made with stacking apertures whereby, immediately after each bag is completed, it is received on chain-supported paired stacking rods in the bag making apparatus thus to build up a stack of desired number of bags. Then by chain movement the stack is moved away, so that stacking can proceed on a successive rod pair brought into place by the chain. Hitherto the bag stack has been removed from the rods by hand, generally with some displacement of the bags in the stack. To prevent further displacement of bags after stack removal from the rods, at times a rubber band has been placed on the stack to hold the bags together.

By another approach appearing in the Dechanciaux U.S. Pat. No. 3,587,410, bag sections made from a horizontally fed thermoplastic flattened tubular film web are successively fed onto a stacking support over preceding stacked sections and there clamped for severing from the web, and during other operations on a next bag section.

Also by prior art, after removal from the rods the bag stack has been carried to a device for welding the bags together in one operation into a block or pad assuring their being held together. This operation has usually used hot rods or needles highly heated to penetrate the bag stack easily. Such work, basically carried out by hand, is very expensive labor-wise, and also represents a strongly malodorous disagreeable operation because of resultant partial thermal decomposition, combustion or gasification of the plastic.

A purpose and object of the present invention is to simplify the stacking, and the securement by welding, of the bags into a pad, while avoiding certain other disadvantages of the prior art. For the attainment of this object, methodwise, by the present invention, as each bag is added to the stack, it is welded to the preceding bag, thereby requiring relatively slight heat energy and lower temperature, for each welding, and with the stacking and welding of each individual bag into the pad being carried out as in a single operation.

In this operation, the bags may be welded at or in the region near to their upper edges, or even at some other edge, but in any event in a manner such that the welding of the bags to one another requires use of only a slight excess of film.

This approach of the invention is applicable with quite diverse structures of the bags thus produced in pad form, and as well with considerable variation in method for fabrication of the bags as such.

The invention may be also advantageously carried out with bags which are stacked either horizontally or vertically. However, in a particularly advantageous way of carrying out the invention, flattened tubular plastic film stock is fed substantially vertically to a welding seaming device operatively moved in a horizontal plane, i.e., direction, and the stacking, and simultaneously therewith welding, of successive bags to the stacked pad is carried out with a substantially vertical and pendant disposition of the bags. By this procedure films with very slight wall thickness can be worked into bags inasmuch as the hanging vertical disposition obviates or extensively diminishes billowing and the formation of folds or like distortions. Further to prevent displacement with very thin film bag material of the invention the individual severed sections or bags are supported at both sides during downward advance, in a vertical or nearly vertical plane, by similarly downwardly directed air streams which additionally straighten out the bags and also accelerate the transport of the very thin films.

This vertical feed and pendant disposition is advantageous where the fed web is comprised of tubular stock or sheet stock folded over to "half-tubular" form and the stacking of bags in a vertical plane is also advantageous for bags of intermediate or heavy film material.

To discharge the bags, stacked in a vertical plane and welded into a pad, first the vertical pad is grasped by a clamping device, the stacking device released, the pad laid off upon a conveyor belt, the clamping device released and then the pad carried off by starting the belt.

Other objects and advantages and inventive features will appear from the following description and the drawings wherein:

GENERAL DESCRIPTION OF METHOD AND PRODUCT

The improvement, by the weld-stacking of the present invention, in production of stacked padded thermoplastic film bags, is applicable to various bag designs and pad forms. Weld stacking, that is, for each bag section, separated from a continuous web, a welding of the section to, and as it is stacked on, the preceding section in the stack, is shown and described with relation to, though not limited to, bags for each of which the respective "leaf" or bag section in the pad comprises a bag hanger or suspension portion, in addition to a portion which becomes the bag proper at the time of use. In this suspension portion is made the weld, at times referred to as the stacking weld, which is carried out in the weld stacking procedure; and each suspension portion has apertures or, in conjunction with the bag shape, forms an aperture with a shoulder, which aligned with like apertures or shoulders of other sections in the pad, affords purchase for pad hanging means, such as pins or a bracket, at the place of use. A perforated tear-off connection of the bag portion to the suspension portion then allows easy manual tear-off of each bag from the pad.

The wide applicability of the stacking welding concept with various bag and pad configurations, and in various methods for production, are separately hereinafter discussed.

PRODUCTS OF FIGS. 1-2, 5, 6, 12, 14, 15, 16, 17, 18, 19, 20, 21, 26, 27

Figure 1:
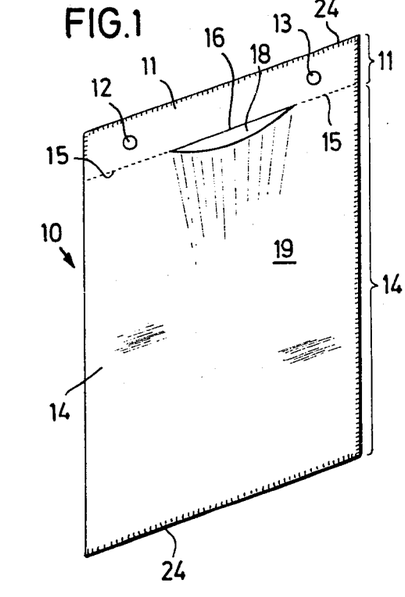
FIG. 1 is a generalized perspective view of an individual tear off bag of one design producible by this invention.

FIG. 1 represents a single bag section 10, produced from a double-layer web of thermoplastic foil as hereinafter described relative to FIGS. 3–4, and comprising a transverse strip-like top hanger or suspension portion 11 perforated through both layers at 12, 13 with hanger holes; a bag portion 14, separable from the hanger strip along a tear-off line defined by the transverse line of perforations 15 through both the back and front walls or film layers 18, 19, and carried across the entire width of the back wall 18, but in the front wall running in from the side edges to the middle region into an aligned locally severing cut 16, normally a straight line, but in FIG. 1 (so also in FIG. 2) appearing exaggerated by a arcuate outward displacement of the adjacent bag part. The top and bottom seam welds 24 and side seam 22 pertain to the particular method of making this bag.

Figure 2:
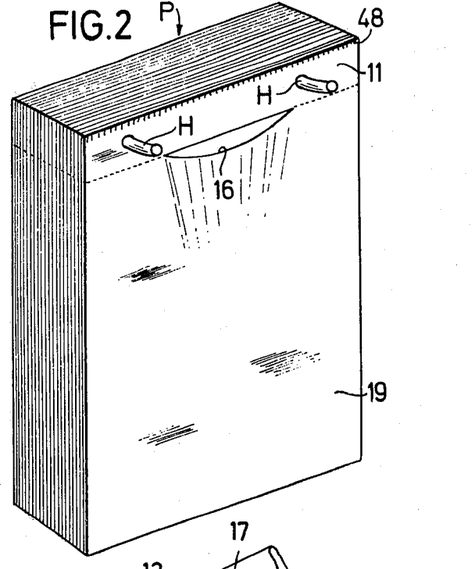
FIG. 2 is a similar view of a pad comprised of many bags of FIG. 1 welded together.

FIG. 2 shows a pad P produced by stack welding a number of such bag sections, each stack welded to the preceding section at 48 substantially entirely across the top margin of its hanger strip 11; the pad being suspended for use on a hanger device or bracket having prongs H received in the apertures 12–13. The interruption of the perforations 15 of the tear-off line by the severing cut 16 reduces the tearing work, and also facilitates the manipulation by one hand; for a slight downward thumb pressure just below the line 16 on the foremost section of a hanging pad cocks the front wall material below the cut 16 out away from the back wall 18, providing the small but gaping opening (as in FIGS. 1 and 2) for easy insertion of the fingers of the same hand, which then exerting a slight foreward tug tears the bag off along the perforations 15 in the front and back walls, with the mouth of the bag then open even as it is grasped in the hand after tear-off.

Figure 5:
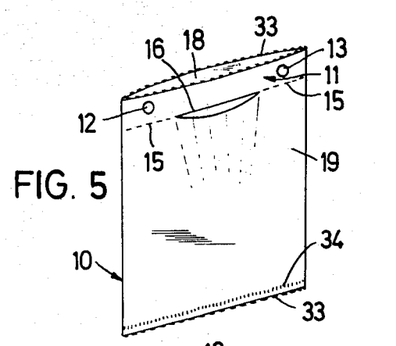
FIG. 5 is a perspective view similar to FIG. 1 of a somewhat modified tear-off bag.

FIG. 5 illustrates a bag in structure and utility basically identical with the bag of FIG. 1, and for which the weld-stacking procedure is likewise applicable to produce a pad such as that of FIG. 2; the torn perforation edges 33—33 at top and bottom, and the slightly inwardly spaced bottom weld seam 34 in FIG. 5 (so also in FIG. 6) rather arising from the particular manner of making the bag section as described relative to FIGS. 7–10.

Figure 6:
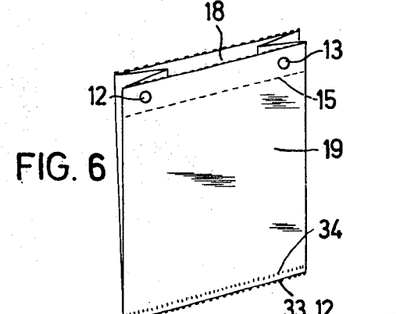
FIG. 6 shows a bag similar to that of FIG. 5 with a slight modification and also gussets, i.e., having side infolds.

The bag of FIG. 6 differs from that of FIG. 5 in structure and fabrication, even to pad form, only in having longitudinally infolded sides, and in omitting the severing cut 16 from the tear-off perforation line 15. In the aforegoing the length of each section, of course, exceeds the length of a bag proper by the width, i.e., height, of the suspension part.

FIG. 12 shows a pad P, again comprised of stacked bag sections; each of which, produced as will be described relative to FIG. 13, includes a top suspension portion 11, with the stack-weld 48 to the preceding section made across the entire top margin thereof and having hanger apertures 12–13. Here, however, the individual sections have gussets, that is, longitudinally infolded sides 40–40 with inner creases or infolded edges 42–42 as shown in the cross-section of FIG. 11 for an expanded bag section; a transversely elongated rectangular cut out opening 49 through front and back walls with corners rounded at the bottom and rectangular at the top; and an aligned tear-off perforation line 46 through front and back walls and side infolds, but interrupted by the aligned top edge of cut-out 49; and finally weld seams at 47 through front and back and infold layers immediately below the perforations 46, and also at 44 to close the bag bottom.

Figure 20:
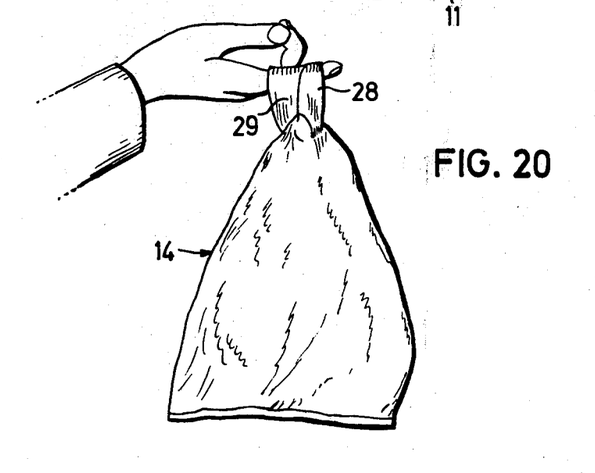
FIG. 20 shows use of a bag with carrying grip loops.

With the ends of the cut-out for opening 49 lying at least slightly outward of the inner edges 42 of the side infolds, when a bag is torn off the pad at 46, the resulting free upward projections 28, 29 at each side thus afford grip loops through which a finger may simply be inserted for carrying the bag with perhaps one loop first pulled through the other, for carriage as represented in FIG. 20.

Figures 11, 12, 13:
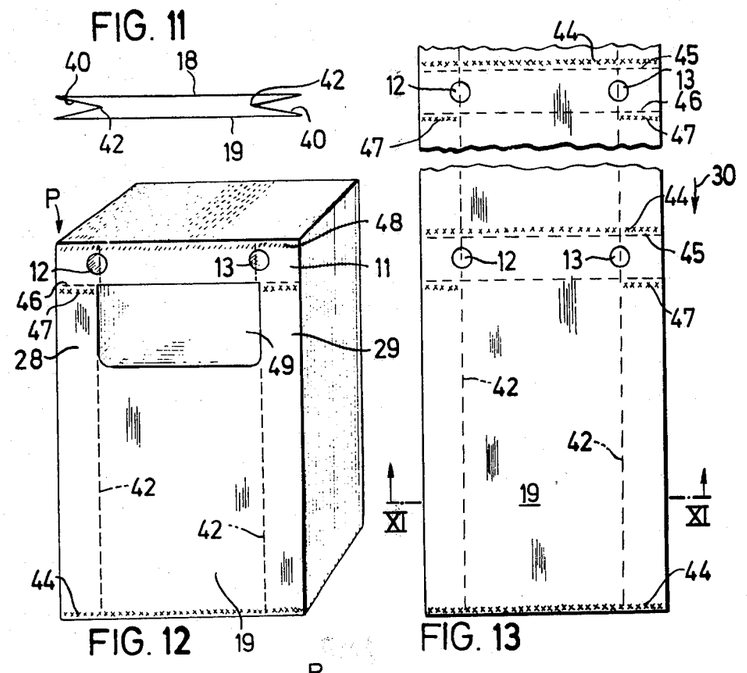
FIG. 11 is a transverse section through a tubular web or resultant bag with side infolds.
FIG. 12 perspective view of a pad of side infolded bags of a modified bag form.
FIG. 13 is a schematic representation indicating a stage in methods for making bags shown, for example, in FIG. 5 or FIG. 12.

FIGS. 14, 15, 16, 17, 19 and 27 represent bag section and bag pad configurations which result in individual bags which, as torn off from the pad are essentially similar to those of FIG. 12 in affording grip loops 28, 29.

Figure 14:
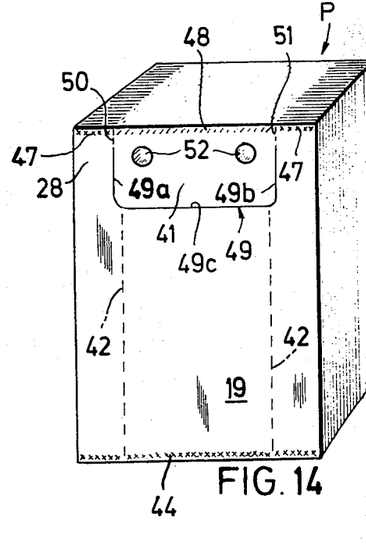
FIG. 14 is a perspective of the pad of bags of construction modified from those of FIGS. 6 and 12.
Figure 15:
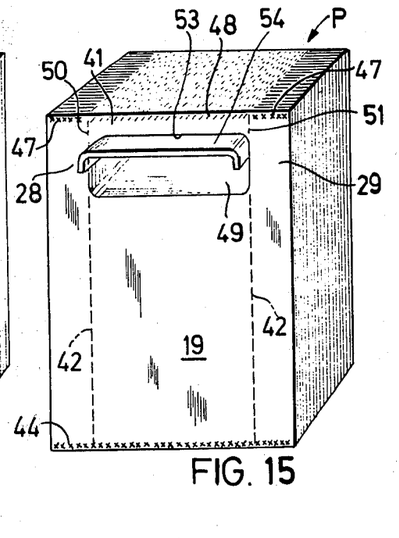
FIG. 15 is a view similar to FIG. 14 showing a modification thereof.

FIGS. 14 and 15 both present pads P comprised of sections from a longitudinal side-infolded tubular web, each of which has a length equal to the length of the bag proper. In FIG. 14, a cutout at 49 is incompletely incised by a broadly flat-bottomed U-shaped cut through front, back and side infold layers, continuous from the bottom edge 49c into sides 49a, 49b, but with the latter stopping short of the top margin of the section, and then as it were carried through to the top by prolonging short lines 50, 51 of tear-off perforations, to define a rectangular suspension portion 41 and the loop regions 28, 29. Across the top of the latter, short seam welds 47, again running in from the section side edges, and at the section bottom, bag bottom seam weld 44, penetrate the front and back wall layers and the infold layers. Suspension holes 52 in the part 41 serve the same purposes as holes 12; and the stacking weld 48 to a preceding section in the pad is made across the top margin of the suspension portion 41 between perforation lines 50–51.

In FIG. 15, the section and pad structures are practically identical with those of FIG. 14, except that a rectangular opening 49 is completely excised with top side spaced inwardly from the top of the section leaving a bridging portion running between the perforation lines 50, 51 as the suspension portion 41 of the section; the lower edges 53 of the latter affording a shoulder in the pad resting upon a hanger bracket plate 54.

Figure 16:
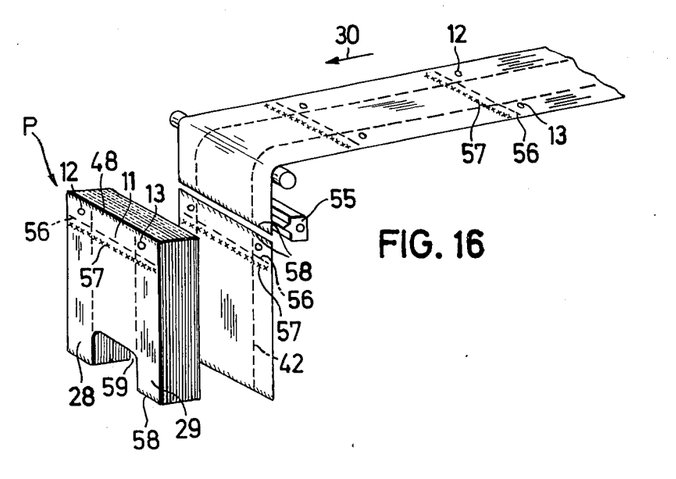
FIG. 16 is a generally schematic view illustrating production, from a side infolded flattened tube web, of a pad of bags of modified structure.
Figure 17:
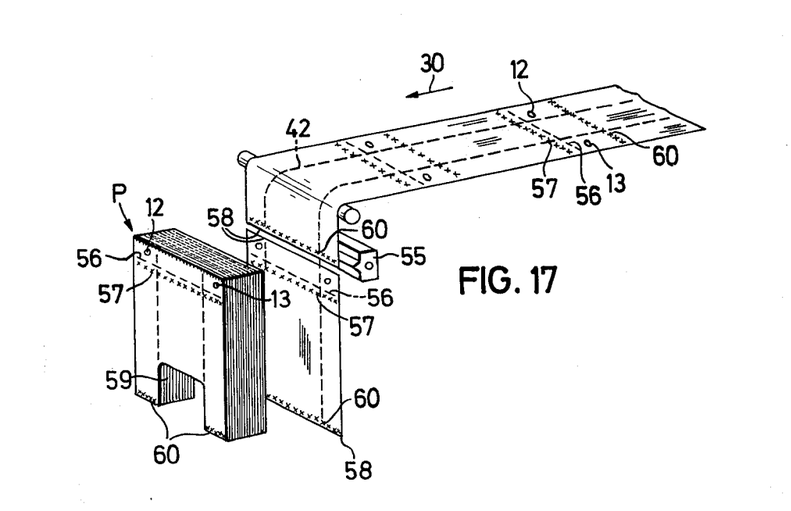
FIG. 17 is similar to FIG. 16, but showing a slight method modification.
Figure 19:
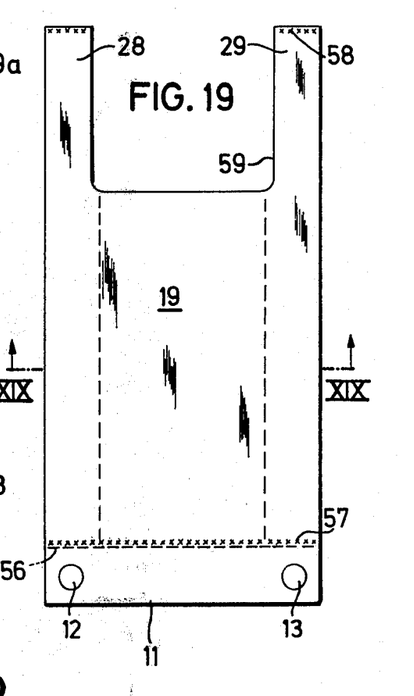
FIG. 19 is a view generally similar to FIG. 18, of a bag modification with side infolds.
Figure 19A:
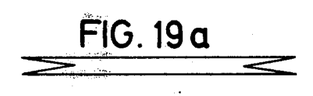
FIG. 19a is a transverse section taken at the line XIX—XIX in FIG. 19 but with the bag slightly expanded for clarity.

FIGS. 16 and 17 show still another bag section and pad configuration for side infold bags with grip loops, where again each bag section in the pad has a length greater then that of the bag torn from the pad, since a suspension part 11 with holes 12, 13 therethrough is provided across the entire width of the section at what actually is the bag bottom, as appears for example in FIG. 19 where a section for an analogous bag is inverted from its orientation in a suspended pad to what is the "normal" orientation of the bag as such.

In terms of the normal suspended pad orientation of FIGS. 16–17, the entire top margin or edge of the suspension strip portion 11 of each section is again stack-welded at 48 to the preceding section, but immediately beneath the transverse tear-off line 56 of perforations through all layers of the section, a bag bottom forming seam weld 57 through all layers is present; while a cut-out 59 similar to 49 in preceding forms, but opening at the bottom of the section, defines the grip loop portions 28, 29 with ends seam welded at or near the very bottom edge of the section.

The representations of the pads P in FIGS. 16 and 17 differ slightly at the bottom end seam welds 58 and 60 only because of section-forming method differences later adverted to for thin and heavy films.

Figures 18, 18A:
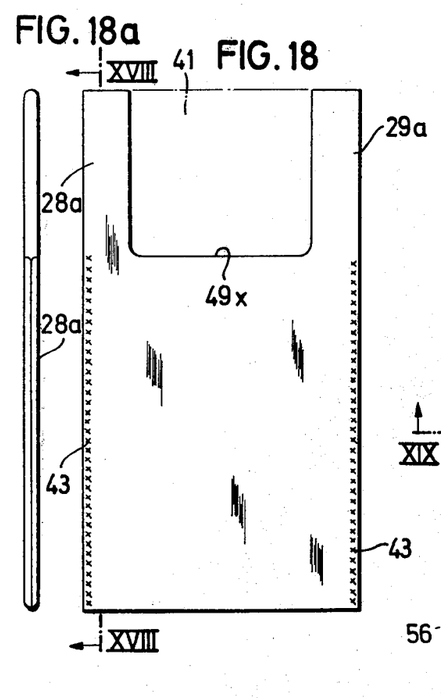
FIG. 18 is a front elevational view of a bag provided with carrying grip loops.
FIG. 18a is an outline of a section taken at the line XVIII—XVIII in FIG. 18 but with the bag slightly expanded for clarity.

FIGS. 18 and 19 represent bag forms or sections which likewise may be weld-stacked in accordance with the broader teaching of the present invention. These, being made of low pressure polyethylene of appropriate gauge, allow the grip loops 28–29 or 28a–29a to be knotted to form a closure if desired, usually with residual finger holes in the remaining free end portions of the loops for carrying as in FIG. 20 making these forms useful for small size packaging. The low pressure polyethylene for this purpose has paper-like characteristics, and the particular advantage that in burning it first forms only hydrocarbons, leading to a cleaner final combustion.

Also it may be here noted that, whereas for the other bag forms or sections herein dealt with, the production methods proceed by severing, from a flattened tube, lengths corresponding to the bag or bag section lengths desired, with the bag width established by the tube width, the form of FIG. 18 has the bag length set by the tube width and the bag width determined by the length severed from the tube, say by heat severing cuts between adjacent transverse side seam welds 43 terminating at the start of the grip loops. By making the section for a FIG. 18 bag by say incompletely excising the cut out region 49x, leaving attached by marginal perforation lines, a suspension portion, e.g., similar to 41 in FIG. 14, the section may be then weld-stacked with the stack welds located in the suspension portion, as might be desirable with such sections then stacked one upon another vertically.

METHOD OF FIGS. 3–4

Figures 3, 4:
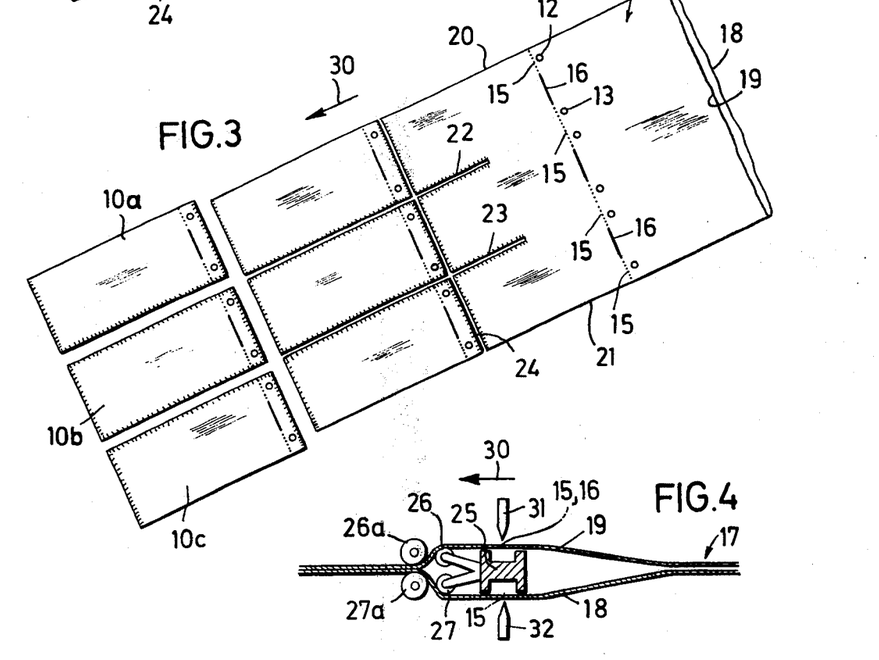
FIG. 3 in a schematic manner represents simultaneous production of several tear-off bags from a broad flattened tubular stack web.
FIG. 4 is a vertical sectional view through a film tube web having a "floating" rail element disposed therein to afford reaction surfaces co-operating with external apparatus elements operating from opposite sides of the web.

In FIG. 3 as a continuous double layer synthetic thermoplastic film web 17 of flattened tubular form advances in direction 30 through a first work station, perforation lines 15 alternating with three like severing cuts 16 are made along a transverse line in the top layer 19, a coincident line of perforations is made entirely across the lower layer 18, and behind the transverse line, the holes 12–13 are punched through both layers in pairs symmetrically located relative to each cut 16; in the top layer, the perforation lines 15 at the web margins 20–21 being half the length of the two between cuts 16. These several perforation lines, cuts and holes are made preferably simultaneously, as it were, in one total operation at the first station; and this total operation is repeated at equally spaced positions along the length of the advancing web.

At a next work station the web as advanced is longitudinally severed along, and the two layers at the same time welded to each other at 22 and 23 on opposite sides of severance lines bisecting the longer perforation lines 15, thus providing in effect three smaller flat tubes. At a third station, the advancing now longitudinally divided web, just behind the holes 12–13, is severed along, and simultaneously the two layers welded to each other at 24 on opposite sides of, a transverse severing line, spaced ahead of the perforation line by a desired bag length, thus producing three similar bag sections 10a, 10b, 10c simultaneously, each similar to that of FIG. 1, with the severance weld seaming 24 on one side of the transverse severance line seaming a following bag bottom and on the other side seaming the two layers along the top of the suspension strip of a just completed bag. Considering the advanced end of the web as the front end, as being in the forward direction, in other words each transverse welding severance of the web is made at a location spaced behind a respective transverse line of perforations 15 and cuts 16 which is the tear-off line in a pad by a distance equal to the height or width of the suspension strip 11.

Figure 22:
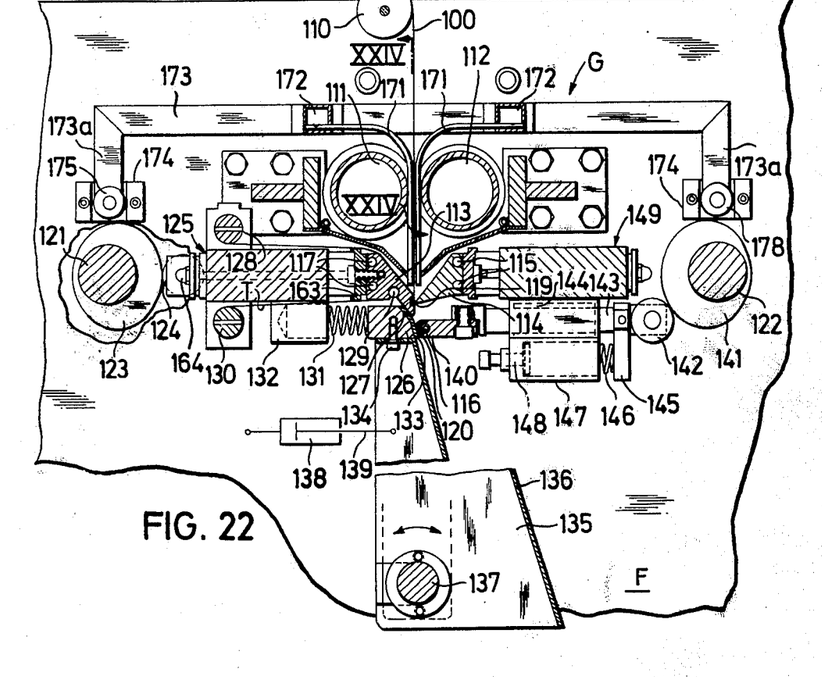
FIG. 22 is a view partially in irregular section of an apparatus for production of a stacked bag pad.

The operations producing the tear-off line (perforations 15, cuts 16) and holes 12–13, the longitudinal division and seam weldings may be carried out with the web 17 running horizontally but preferably thereafter the web is directed to run vertically downwardly, for example into the apparatus shown and described relative to FIG. 22, for effecting the transverse severance, conjoined with seam welding to be followed by horizontal stacking, that is, bag sections disposed vertically are moved horizontally onto preceding sections with the thickness of the pack or stack increasing horizontally, and simultaneously as each section is added to the stack it is stack welded to the preceding section.

The phrases "line of perforations", "perforation line", and the like are to be understood as meaning the preferred formation of a series of short aligned incisions or cuts alternating with at least equally short uncut portions of the film material, rather than merely round holes.

FIG. 4 shows a composite device or apparatus subassembly for producing the tear-off line, as comprised first of an elongated horizontal bar 25 supported within and extending across the width of the web 17 by correspondingly elongated support rollers 26, 27, with the web in turn locally supported above and below by external rollers 26a, 27a, which are mounted in a machine frame, and between which the web advances. The bar 25 has an appropriate form and cross section with recesses or the like to serve as a counter blade or reaction member for the upper and lower blade elements 31, 32. Blade 31 is a combined perforating-severing knife adapted to make the perforation line 15 in the lower layer 18; and both perferably also carry punch formations to produce the holes 12–13.

By the method of FIG. 3, a plurality other than three of smaller tubes is derivable by corresponding division of a wide web with a corresponding plurality of tubes simultaneously produced. Also with the device of FIG. 4 used, so too where weld stacking with the apparatus of FIG. 22 and subsequent figures is used, the web is advanced intermittantly by length increments corresponding to bag section lengths.

Further, it is to be noted that the tubular web for purposes of the FIG. 3 method, as generally in this application, may originate as an actual extended tube flattened and supplied for method purposes, or may be produced as used from rolls of flat wide strip film, either strips brought together, or a strip folded onto itself, to provide two layers longitudinally seamed into the tube form; with subsequent continual longitudinal side in-tucking or infolding to provide an infolded or gusseted web.

METHOD OF FIGS. 7 to 10

Figure 7:
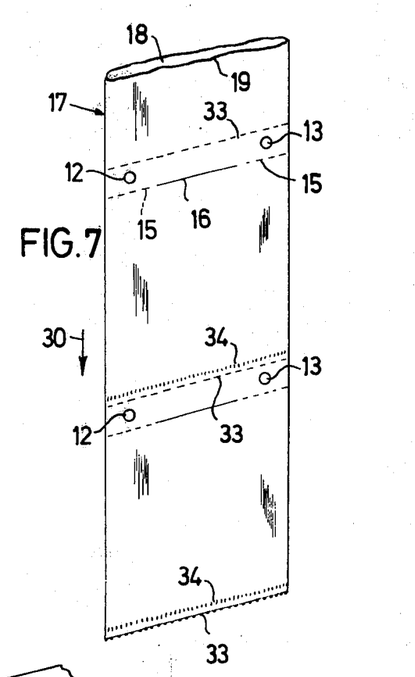
FIG. 7 is a generally schematic view of a vertically disposed tubular web showing certain steps towards the production of FIG. 5 type bags.

In FIG. 7, a simple tubular web 17 has a width which is equal to the width desired in a bag section having the form of FIG. 5. As the web advances through a first work station, as in the case of the FIG. 3 method, bag tear-off lines are made at successive longitudinal spacings, equal to bag section lengths (i.e., the length of a bag proper plus the height of a suspension strip), each comprising here in the top layer only a single severing cut 16 and the aligned two shorter lines 15 of perforations from each edge coincident with a full perforation line in the bottom layer; these being made effectively in one total operation along with the suspension hole pair 12–13. In this case, a second transverse line of perforations is made through both layers at 33 spaced behind the tear-off line 15–16, by a distance equal to the suspension strip height; being produced at the same station and in the same single total operation, with the bag tear-off line and holes as suggested by FIG. 8.

At a next work station in the direction 30 of web advance, downward in FIG. 7, a bag-bottom forming transverse seaming weld 34 is produced immediately behind each perforation line 38. The latter lines actually are provided to facilitate separation of the successive bag sections from the web end, by a parting or separating operation finally carried out by applied force or even a hot severing operation, to produce the separate sections of the FIG. 5 form. The section separating operation may be carried out immediately after or in conjunction with the application of the bottom seam weld 34, for example, in the apparatus of FIG. 22 and following figures, wherein the forward end of the web 17, already worked to the form shown at the bottom of FIG. 7, is descending vertically as the web portion 100 of FIG. 22, therein to be weld stacked to a pad as noted for FIGS. 1–3. The broad operation of separating individual sections from the web will at times be referred to as severing of the sections, and the separated sections are denominated as "severed" though this is achieved in various ways as noted.

Figures 8, 9, 10:
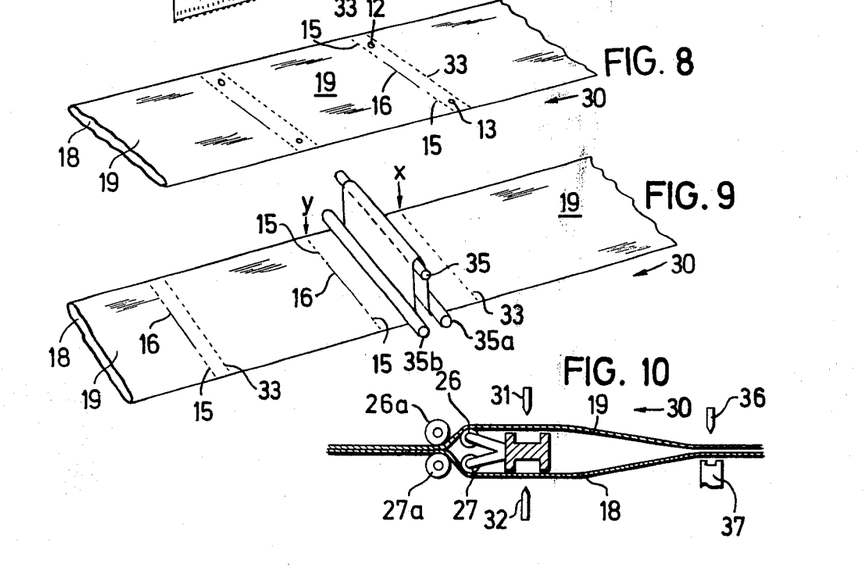
FIG. 8 is a schematic representation showing the production of perforation patterns in a horizontally extending portion of a web.
FIG. 9 in a view similar to FIG. 8, shows a modification method-wise and apparatus-wise.
FIG. 10 is a vertical section similar to and showing an addition to FIG. 4.

The bag tear-off line may omit the severing cuts 16, resulting in simple coincident perforation lines 15 through both layers as shown in FIG. 6, produced otherwise by the method of these FIGS. 7 and 8 and processed to a pad by weld stacking as described. Since FIG. 6 happens to show a section having side infolds, of course, a similarly side infolded web would be the starting web for this specific bag section form.

Where the separation line 33 is not made in the same work station conjointly with the tear-off line 15–16, it becomes possible to locate the tooling therefor at respective stations, designated X and Y in FIG. 9, spaced in convenient locations, fixed if desired, along the web path, by use of the intervening guide roller arrangement of FIG. 9. The web is carried over or trained about guide rollers 35a—35b, fixed parallel to the web and to each other above the web path, and about a superior third parallel roller 35 vertically selectable in spacing above the other two, so that by vertical adjustment of 35, the web length between stations X and Y is changeable, and accordingly the spacing at which the tear-off line 15—16 is made in front of a respective line 33 can be readily and precisely varied, without tool shifting and quite independently of the tooling spacing.

FIG. 10 shows again more or less schematically apparatus or tooling for making the tear-off line 15—16 and for making the separation line 33; for making the former being identical to that shown and described in FIG. 4, to which there are merely added a simple perforation incising knife or blade 36 above the web in opposition to an appropriate cooperating counter-blade or element 37 below the web.

METHOD OF FIG. 13

For production of bags with grip loops, conveniently there is used a tubular web of the cross section seen in FIG. 11, (shown with web expanded) with gussets or longitudinal side infolds 40—40 joining walls or layers 19, 18, since excising opposed parts of the infold edges 42—42 will open the web sides.

FIG. 13 shows such a side infolded web, which in passing in the direction 30 through one work station has simultaneously produced therein through all layers, and preferably by one tooling assembly: a transverse seam weld 44; a transverse line of perforations 45 immediately in front of 44; a second perforation line 46, spaced in front of 45 by the desired height of a suspension strip portion 11 (say in a bag section as appearing in FIG. 12); suspension holes 12, 13; and immediately in front of 46, aligned short seam welds 47—47 running in from the web edges to the infold edges 42. This pattern is made at successive locations on the web longitudinally spaced equal to the desired bag section length, with the spacing between a perforation line 46 and the perforation line 45 of a preceding pattern then representing an actual bag length.

At the forward end of the web each successive leading section, while vertically disposed, is separated from the web (for a FIG. 12 type pad product) along the line 45, horizontally stacked on and, along the top margin of its suspension portion 11, stack welded to the preceding section in the stack, until the pad stack contains the desired number of bags. Thereafter the window-like cut-out is made at 49 through the entire pad with side margins overlapping, and thereby shearing away the adjacent portions of, the infold inner edges 42 and with the cut out top edge preferably coinciding with the material weakening perforation line 46, which thereafter appears only as the aligned short tear-off perforation lines 46 above the short welds 47.

METHODS FOR FIGS. 14 and 15

For the pad product of FIG. 14, the FIG. 13 method may be modified by shifting the suspension hole locations inward from the infold edges 42–42 omitting the tear off line 46, and locating the short seam welds 47 immediately in front of separation perforation line 45; and in front of each line 45 making the broad flat bottomed U-shaped incision 49 (appearing in FIG. 14) along with tear-off lines 50, 51 aligned with the vertical legs or sides 49a, 49b respectively and running up to the line 45, the ends of the incision again overlapping side infolded edges 42. Thus each bag section includes, within the confines of an actual bag length, a suspension portion 41 having therein suspension holes 52; and the pattern of welds, cuts and cutsand perforations accordingly is repeated at bag length spacings along the web. As the bag sections are successively separated from the web leading end and weld stacked horizontally one upon another, the stack weld 48 of each to the preceding is made only along the top margin of the suspension part 41 and between the tear-off lines 50–51; again as in previous cases, the horizontal stack welding being performable for example with hereinafter described apparatus of FIG. 22 and modifications.

For the bag pad of FIG. 15, the method modification described for FIG. 14 is basically used, except that no incision for support aperture purposes is made until after the bag sections are stack welded into a pad, whereupon the elongated rectangular opening 49 is punched out of the entire pad with lateral ends again overlapping the infold inner edges 42 and in alignment with the short longitudinally directed tear-off perforation lines 50–51. Between lines 50–51 there remains a bridging suspension part 41 for each section, at the top margin of which the respective stacking weld 48 is made; the bottom margins of the parts 41 forming then a support shoulder in the stack.

METHODS OF FIGS. 16 and 17

In producing the bag pad stack P of FIG. 16, from a side infolded thin film web intermittently advanced in the direction 30 by respective bag section length increments, at one work station by an appropriate tool there are simultaneously produced through all layers of the web: suspension holes 12, 13; spaced forward of the holes, a transverse perforation line 56 for a bag tear-off line extending across the entire web; and immediately before line 56, a bag bottom forming seam weld line 57 across the full web width. This pattern is produced at each halt of the web, and therefore is repeated at web longitudinal spacings equal to the bag section length.

The leading end of the web is roller guided to vertical pendant disposition, so that a weld seaming and severing device schematically represented by 55 may sever the leading web section behind holes 12–13 and at a location spaced behind the tear-off perforation line 56 by the height desired in a bag suspension strip portion 11; the layers of the web at web edges 58—58 on opposite sides of the severing line being simultaneously all weld seamed together, in other words along the top margin of the suspension strip portion 11 and at the bottom of the yet unstacked section. Again the successive sections, as severed from the web, are horizontally weld stacked, with the stack weld 48 for each to the preceding made across the entire top margin of the respective suspension strip, where one seam weld 58 occurs, so that in the ultimate pad structure that seam weld 58 is functionless, though it may facilitate some aspects of the overall weld stacking operation. After a stack has been built up to intended size or bag content, the inverted broad flat bottomed U-shaped cut out 59 is made through the bottom of the entire unified stack and again overlapping the adjacent parts of the side infold edges 42 of the several sections and producing the grip loop portions 28, 29.

With heavy films the severing-welding device 55 does not produce seams along section bottom edge 58 which can be relied upon adequately to secure the four film layers, front, back and infold layers, in what become the top margins of the grip loops; so that 55 then serves only as a web severing device. FIG. 17 shows a modification of the FIG. 16 method by providing a strong transverse seam weld 60 through all layers across the entire web width, behind each pair of holes 12–13 at a location spaced from the tear-off perforation line 56 a distance slightly greater then the intended suspension strip height. Accordingly each severing cut made by device 55 occurs just in front of a weld seam 60, so that in addition to whatever seaming is attained immediately along the edges 58, a certain secure seam 60 is provided for the regions becoming the grip loop tops, such as the strong weld seam 57 provided for the bag bottom region.

APPARATUS FOR STACKING AND WELDING (FIGS. 22–24)

Figure 23:
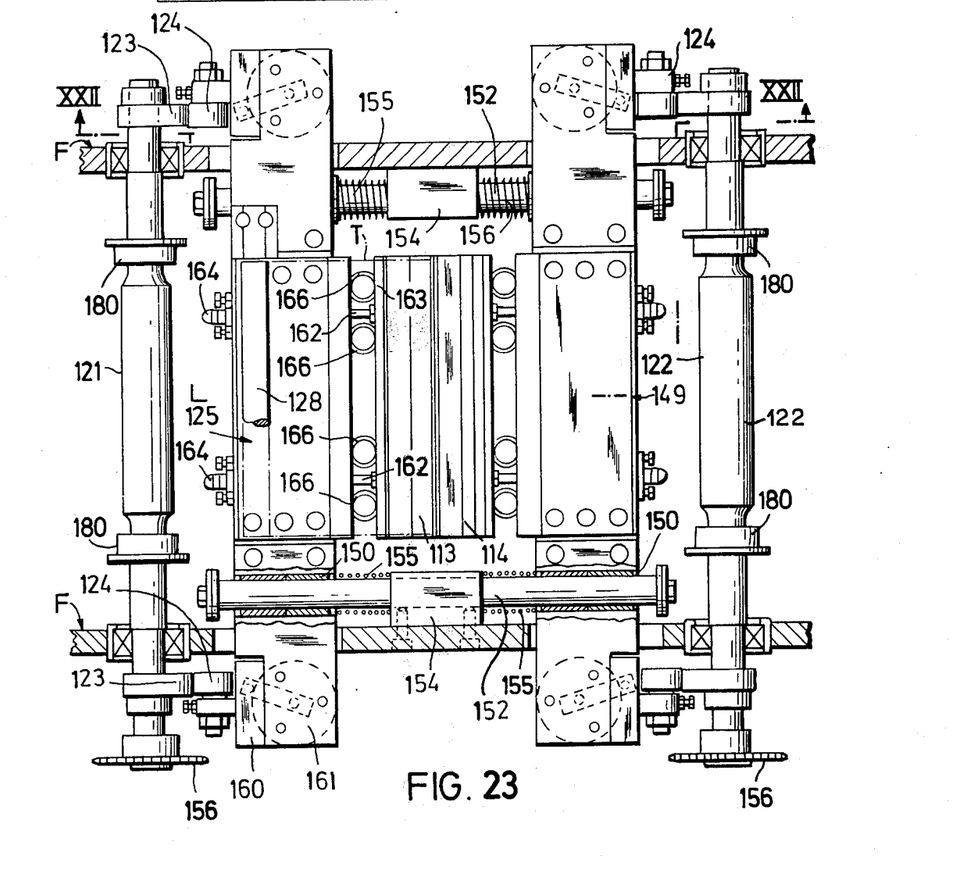
FIG. 23 is a top plan view of welding bar and actuating mechanism of FIG. 22, with omission of the web advance rolls, cooperating guide combs and associated structures.
Figure 24:
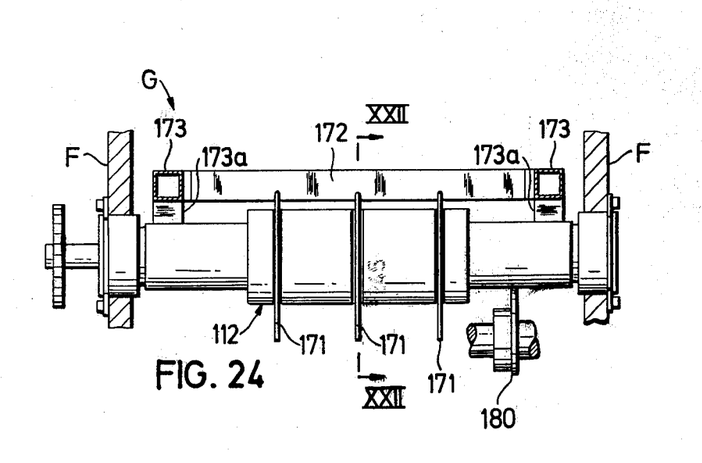
FIG. 24 is a side elevational view of a web advance or feed roll with a guide comb, the view taken generally at the line XXIV—XXIV in FIG. 22.

The apparatus shown in FIGS. 22–24 for carrying out the manufacture of horizontally stacked and weld-stacked bag pads, (for example, the pad P in FIG. 21), in general organization best seen in FIG. 22, comprises a main frame fragmentarily represented in various figures by opposed vertical parallel frame plate members F; web feed and advance means or mechanism including a frame-supported and journalled horizontal web guide roll 110, and a pair of cooperating opposed parallel web advance rolls 111, 112, having opposite ends journalled in the frame with axes horizontally coplanar; a web guide and directing mechanism G associated with the advance rolls; a pair of cooperating web welding and severing jaws 113, 114 extending parallel over the width of the web path and operatively horizontally shiftable toward and away from each other and relative to a portion of web 100 fed vertically therebetween from rolls 111, 112; mechanism for horizontal stacking and stack welding of severed web sections, including a portion of jaw 113, a bag section clamping bar 126 cooperating with the jaw 113 and with a pressure bar 140; a stack support table 135; and a pair of driven parallel cam shafts 121, 122 with ends projecting through and journalled in the frame members, for acutating the jaws and the web guide and stacking systems in timed relation to each other and to incremental web advance by bag section lengths, by virtue of a common power drive not detailed in the drawings.

The rolls 111, 112 advance the web incrementally by an amount corresponding to the length of a bag section or to the width of a bag to be made for bottom seamed or side seamed bags, respectively.

Figure 22A:
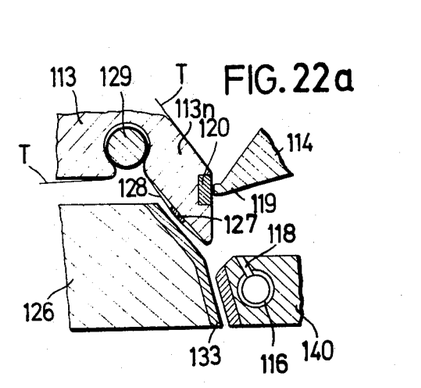
FIG. 22a is an enlarged detail section of a stacking device appearing in FIG. 22.

The jaw 114 is heated by electric rod element pair 115 with jaw 113 normally an unheated counter support member or reaction jaw for 114, but 113 can also be heated by rods 117 and transmit heat from the latter to 114. More clearly seen in FIG. 22a, the jaw 114 tapers to a thus heated narrow web-contacting horizontal longitudinal rib 119 cooperatively opposed by a rubber or elastic insert 120 in a face groove of jaw 113.

The welding bar jaws 113, 114 are similarly horizontally reciprocably supported and actuated by an arrangement generally symmetrical about the vertical plane of web descent (see FIG. 23) by respective support beams 125 and 149, with opposite ends projecting through slots in frame members F. Each support beam is bushed near its respective ends with bearings 150 for slideable support on two parallel fixed cylindrical slide rods 152, each to serve both beams being secured at its middle-region to the adjacent frame member by a support bracket block 154. By pressure of compression springs 155 interposed on the rods 152 between brackets 154 and the support beams, the latter, and hence the jaws, are biased away from each other.

On the outboard ends of shaft 121, like rotary cam disks 123 engage cam follower rolls 124 on the projecting ends of support beam 125 thereby to move jaw 113 inward against the spring bias force and in turn by spring force to allow jaw recession as the cams recede. Each cam roller is anchored by a slide 160 in a support beam groove to be longitudinally shiftable by a rotational solenoid 161 to carry the follower 124 out of operational alignment with the respective cam. By similar structure, motion is imparted from cam disks on shaft 122 to support beam 149 and welding jaw bar 114; and the shafts through respective gears or sprockets 156 are simultaneously driven in phase by an appropriate gear or chain drive.

Jaw 113 is connected to its support beam 125 (and with a similar arrangement the jaw 114 to beam 149) by a pair of rods 162 with forward ends passed through the jaw backing plate 163 to thread in jaw 113, the rods extending back through respective bores in beam 125 to adjusting nuts 164 engaging the beam back, whereby the jaw is drawn back against four upright hollow cylindrical metal spacers 166 held vertically captive in broad shallow grooves in the opposed faces of the beam and backing plate.

Though other components to be described are differently associated with the two welding jaws and their support beams, the structure thus far described for the jaw mountings and actuation are identical for each jaw, providing cam shafts with axes in a common plane parallel to each other, to the beams and to the jaw functional surfaces, short spacing from the shafts to the beams and jaws, and identical motions though in opposite sense in the horizontal reciprocation of the jaws relative to the web path and to each other.

A supply roll 128 and take-up roll 130 (see FIGS. 22–22a) are mounted on the top and bottom sides of support beam 125 for a wide band T of heat resistant sheet material, such as "Teflon", led over the active vertical front face of jaw 113 and its insert 120, back up over the sloping rear clamping face of the dependent longitudinal nose or lip 113n of 113 fand the electrically heated resistance tape stack welding element 127 running the length of the jaw back face, to pass around a guide rod 129 in a jaw bottom recess. This band minimizes or prevents the thermoplastic bag material from sticking to or fouling certain heated surfaces.

The bag stacking and stack welding means includes the forementioned stack clamping beam or bar 126 having at least a front face top portion sloped corresponding to the back clamping face slope of jaw lip 113n over the length of which 126 extends, and faced with rubber 133; a plurality of bias compression springs 131 supported in recesses of spring housings 132 mounted on the bottom of beam 125 to bear against and urge 126 toward clamping relation with the back clamping face of jaw 113; and a so-called stacking support table 135 pivotally supported in the frame by pivot shaft 137 and supporting the bar 126 secured to its top end by screws 134. A pneumatic or hydraulic cylinder unit 138 is secured to the frame or to a hanger from beam 125 and with piston rod 139 connected to the table. Accordingly the bar 126 can move back with jaw 113, and also can be moved away from jaw 113 by action of piston unit 138 to release a bag stack clamped therebetween as hereinafter explained.

Table unit 135, made of sheet metal formed into a U-shape as seen in horizontal cross-sections and upwardly tapering in side elevation, has a sharply sloping nearly vertical rectangular stack support front face 136 preferably with a rubber facing.

The pressure bar 140, coextensive in length with 126, and having a rubber covered front face smaller in height than but sloped correspondingly to the cooperating lower face portion of 126, has a longitudinal air supply passage 116, opening through upwardly forwardly directed outlets or a longitudinal slot nozzle 118.

Bar 140, to move toward and away from 126, is supported at both ends by a respective horizontal slide element 143 slideable in a slide-way housing 144 and at its end remote from bar 140 carrying a cam follower roller 142, kept in contact with a respective cam by action of a bias spring 146 in fixed spring housing 147 bearing against side arm 145 of slide 143; the effect of spring 146 being adjustable by screw 148 threaded into the spring housing bottom. The pressure bar 140 may be operated by the cams 141 on shaft 122 actuating the jaw 114 by appropriate placement of the followers and suitable cam contouring, for picking up motion for 140 sequenced relatively to action of jaw 114; or by distinct cams on shaft 122.

The mechanism G includes, associated with each advance roll, a plurality of parallel thin tubes 171 running horizontally out from a hollow supporting cross bar 172 to bend downwardly in parallel vertical spacing, providing respective rake-like structures, each with its set of prong-like verticals accommodated in circumferential grooves of the respective roll (FIGS. 24, 22) to extend down along a corresponding side of the web path into the inter-jaw region.

The cross bars 172 in parallel are connected at opposite ends to long horizontal side members 173, each supported on an adjacent machine frame member F by slideable engagement of its dependent ends 173a in frame-supported brackets 174; the inverted U-shaped members 173a and cross members thus forming a vertically shiftable support frame for the rake structure and tubes 171 (shown in upmost position) shifted by rotary cam disks 180 (shown only in FIG. 24) engaged by cam followers rollers 175, to cause elements 171 to descend between the jaw working surfaces when retracted and keep web material free therefrom. The cross bars 172 are hollow to serve as pressurized air manifolds for the tubes 171 attached thereto, as part of a air supply system timed for discharge of air through elements 171.

OPERATION

Figure 21:
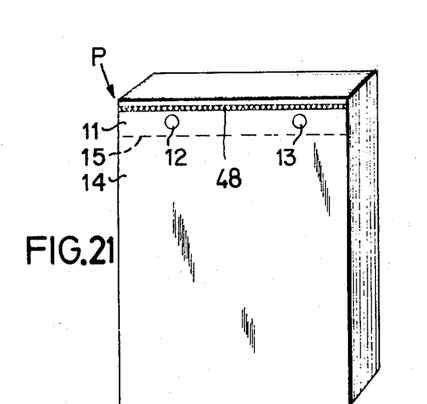
FIG. 21 is a perspective view of a pad of bags of a still further modified form.

Production of bag pads of the type shown in FIG. 21 is assumed with the horizontal reach of the web 100 coming to guide roller 110 already provided with appropriate longitudinally spaced patterns of suspension holes, tear-off perforation lines and the like, so that only severance of a section from the web or severance and bottom seam welding are to be carried out at the jaws.

With advancement of the web for a section length, by the cams the jaws open and bars 126–140 separate, the elements 171 descend freeing the bottom of the web if adherent to the jaws and discharging air to steady the web and avoid fold formation by providing an air cushion on each side. As soon as the section length feeding advance of the web is completed, with the prongs 171 lifted upwardly, the jaws 113, 114 come together on the web to sever the section, with welding as required, the bar 126 returning from retraction with 113, and the pressure bar 140 moving toward 126 to clamp the top region of the advanced web section for retention upon severance. Further advance of the pressure bar 140, cam effectuated, with the recently advanced bag section still clamped, moves bar 126 backward against springs 131 away from the back clamping face of jaw lip portion 113n. As a sufficient gap between 113n and 126 is developed, air is discharged from manifold passage 116 directed by nozzle 118 at the top of the severed section above the locus of clamping, thereby displacing or inserting the top of the section from the front of 113n into the gap. Thereupon the pressure bar retracts, and 126 under spring bias clamps the inserted top edge of the section against the back surface of 113n. It may be here noted incidently that where section separation perforation lines are provided in the web, the motion of the clamped upper region of the advanced section relative to the web above the then-closed jaws may effect or complete a section separation by a tear-off type action.

Immediately the jaws again separate to repeat the cycle with a second web advance, the bar 126 again moving back against springs 131 upon shift of jaw 113 with the first severed section yet clamped between 113 and 126, while the second section is fed. Upon jaw closing motion, the second section is clamped by 140 upon the first against 126 in a "horizontally stacked" disposition completed with the displacement of the top region of the second section into the gap, and return of 126 toward 113n clamping both severed sections therebetween, now with a momentary heating of element 127 (omitted since useless for the first section cycle) to weld the second section to the first at the top margin (as at 48 in FIG. 21).

Repetition of this complete weld-stacking cycle is carried out until a stack of bag sections of desired number has been built up. Thereupon cylinder 138 is actuated to pivot table 135 to the left, hence draw 126 away from 113n; thereby, since pressure bar 140 is not advanced toward 126 at such cycle point, releasing the completed pad to drop away or be otherwise discharged from the mechanism. Thereupon production of another pad of bags is immediately begun.

It is to be noted that basically the same method may be carried out with the jaw 113 fixed and only 114 movable with appropriate apparatus modifications and also with various welding or severing device forms, such as a welding wedge cooperating with a counter-bar or rubber roll as a counter element; that with suitable end guiding of the jaws and support beams, only a single centrally disposed cam can be used for each; and that the web guide mechanism G may be stationary by use of air discharge during the web advance. Also the air need not discharge from the ends of prongs 171, but advantageously also through outlets distributed over the length of each, even with lattice or baffles to direct the air discharge streams parallel to or obliquely downwardly along the web.

APPARATUS FIG. 25

Figures 25, 26, 27:
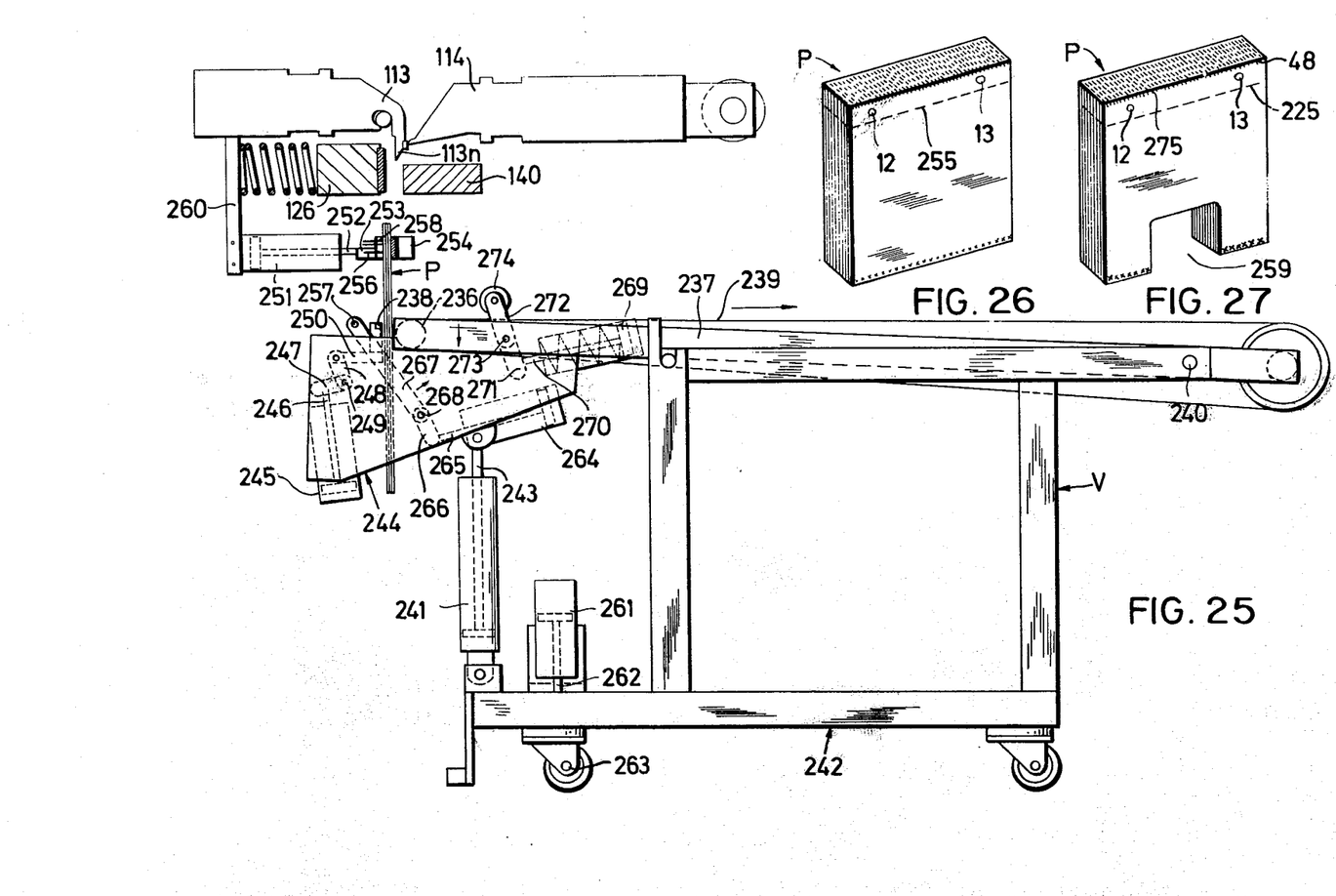
FIG. 25 is a side elevational view, partially schematic, of an arrangement for discharge of finished bag pads, from fabricating apparatus of which certain parts present a modification with certain other parts in outline form.
FIGS. 26 and 27 are perspective views of other bag pads.

FIG. 25 presents an addition to the weld stacking structure of previous figures for certain post-stacking operations, and also a finished pad discharge table. The welding severing jaws 113, 114, the clamping and pressure bars 126 and 140 are in effect schematically represented, and may take a form preferably with jaw 113 stationary; but may have also the weld-stacking mechanisms of other figures. The apparatus is shown in the condition for completion of weld-stacking operations for a pad P already released and dropped from the stacking mechanism, but engaged by subsidiary clamping means to be described.

The pad discharge table comprises a caster wheeled stacking apparatus, including the wheel supported base 242 and a frame V on the upper part of which a horizontal pivot shaft 240 pivotally supports a conveyor belt frame 237 supporting belt 239, intermittently driven to the right in its upper reach by somewhat more than pad length increments. At the left end, the hydraulic or pneumatic cylinder unit 261 anchored to the frame has its piston rod 262 coupled to a vertically shiftable support for wheels 263 whereby the entire frame in effect is pivotal to a degree about the wheels at the opposite end. A skirt-like housing 244 is secured on frame 237, depending from and projecting beyond its left end at a position to enclose the lower end of a descended pad P; and another fluid pressure operated cylinder unit 241 pivoted at one end to base 242 and at its other having piston rod 243 linked to housing 244 serves to pivot the conveyor frame. At the beginning of a cycle of operation the frame 237 is raised.

As the mentioned subsidiary clamping means, a clamp plate 238 is shiftable toward and away from the adjacent end support roller 236 for clamping the pad P by a double-acting cylinder unit 245. The latter, secured to the housing, has piston rod 246, acting on one arm 247 of a rocker arm or knee lever pivoted on shaft 249 in the housing, and its other arm 248 connected to clamp support 250 to shift clamp 238 between clamped and open positions.

A further housing-supported double-acting cylinder unit 264 has its piston rod 265 connected to the lower end 266 of a swinging open frame supported in the housing by horizontal pivot shaft 268. The frame side arms 267 clear the pad clamp mechanism and their upper ends are spanned by a pad-engaging shift rod 257 which, upon extension of cylinder 264, swings against the upper part of a pad clamped by 238, to lay it over the conveyor belt end while the belt is stationary. This action brings the pad top end into position to be held between the belt and a roller 274 mounted between the arms 272 pivotally supported by shaft 273 on opposite sides of the belt.

Roller 274 is raised from the belt by fluid pressure applied in cylinder unit 269 mounted on the far side of frame 237 having piston rod 270 pivotally connected to the lower end of the downward extension 271 of an adjacent arm. The piston is biased toward retraction, hence roller 274 toward the belt by a compression spring within the cylinder. Upon such roller engagement with a pad and release of clamp 238, the pad is retained on the belt until carried off to the right out from under the roller by an increment of belt drive.

For performing operations on a stack-welded pad of bag sections further apparatus is provided, comprising a cylinder 251 mounted by rigid support 260 on the fixed support of stationary jaw 113; and a perforating or punching type device 253 carried on the end of the piston rod 252, for engaging one side of a stack or pad, and cooperating with an appropriate tooling reaction support or counter blade assembly 254 on the other side of the pad. Device 253 may include, for example, a perforating knife at 256, hole perforating or cutting punches or pins 258, and/or a U-shaped notching knife whereby there may be produced through the entire stack, the tear-off perforation line 255, suspension holes 12–13, and/or the bottom cut-out opening 259, appearing in FIGS. 26 and 37. This is especially useful where it is desired to avoid any operation on a web prior to severing seam welding at the jaws 113, 114.

In typical operation of FIG. 25, as the bag sections are severed and horizontally stacked at 113n, 126, 140 by the operations previously discussed as to other figures, the lower end of the pendant growing stack is disposed in housing 244 between the belt end and the retracted clamp 238 and with the discharge table in uppermost position, i.e., 241 extended and 261 extended.

When the stack P is completed, first it is clamped by actuating and extending cylinder 245 to close 238; the pad is released by retracting 126; and immediately, by contracting 241, the frame 238 is lowered sufficiently to bring the pad down to the position of FIG. 25, with its upper end between the yet spaced working tool elements 253–254. Then the cylinder 251 is actuated to bring the described tooling into operation and finish the pad P. Immediately the tooling is released, i.e., at least 251 retracted, and preferably also 254, away from the stack path, and the frame 237 is lowered still further to clear the stack top from the inter-tooling space, by contracting cylinder 261; and thereupon cylinder 264 is extended laying the upper half of the pad over onto belt 239.

Descent of roller 274 onto the pad end then occurs, clamp 238 is released and the belt driven sufficiently to carry the bag pad P out beyond roll 274. Then the total cycle is repeated beginning with a web section feed between jaws 113, 114.

The tooling described as associated with the stacking mechanism could also be mounted in the discharge table; and in any case the entire apparatus may be used for stacking bag sections which are not to be stack-welded.

What is claimed is:

1. A method for manufacture, from thermoplastic synthetic plastic film, of bags such as carrying bags or the like packaging stacked and connected with one another through welding into a tear-off type pad, comprising the steps of:
   providing a flattened film tube as a longitudinally advanced, continuous web comprising two layers of said film; feeding said web longitudinally downwardly vertically to a welding device acting in a horizontal plane;
   severing from said web sections corresponding to respective bags; stacking the severed sections successively into a pad stack; and
   stack welding each section to the preceding section as it is added to the stack
   with the sections being welded at, or in the region of, respective like edges;
   the stacking and welding of the bag sections to the stack being carried out at said device with a substantially vertical disposition of the bag sections.

2. A method as described in claim 1, wherein
   said web is provided as a flattened film tube, and including the step of
   defining in each section, at least in part by perforations through the web, a bag suspension portion and a bag portion attached to and separable from the suspension portion at the perforations; the said stack welding of each individual bag section into the bag pad being carried out in the suspension portion.

3. A method as described in claim 1, wherein
   bag sections, having the lengths of bag portions therein extending longitudinally of the web, are severed from the web by making respective transverse lines of perforations through the web and subsequently parting successive sections at the respective perforation lines.

4. A method as described in claim 1, wherein
   bag sections, having the lengths of bag portions therein extending longitudinally of the web, are severed from the web by severing-seaming welds through the web.

5. A method as described in claim 1, wherein
   bag sections, having the lengths of bag portions therein extending transversely of the web, are severed from the web by successively transversely severing-welding of the web at spacings corresponding to the desired width of bags.

6. A method as described in claim 1, wherein
   said web is provided as a flattened film tube having longitudinal side infolds,
   and including the steps of:
   making for each section transversely aligned welds of limited lengths, in from both tube edges and perpendicularly thereto, through the four film layers present at the side infolded margins of the tube; and
   defining in each section, at least in part by perforations through the web, a bag suspension portion and a bag portion separable from the suspension portion at said perforations;

the stack welding of the individual bag sections into a bag pad being effected in the suspension portion and near to the transverse welds of limited lengths.

7. A method as described in claim 1, wherein said web is provided as a wide flattened thermoplastic synthetic plastic film tube, and including the steps of making a transverse bag tear-off line extending over the entire tube width, by perforations therethrough;

thereafter sub-dividing the tube into a plurality of narrower individual tube portions by longitudinal severing welds; and thereafter effecting said severing with bottom seam welding of the said individual tubes, by a transversely running severing weld made across the web at a spacing from the transverse line of perforations corresponding to a height of a desired bag suspension portion, into indivudual sections;

whereby each section contains a bag portion and bag suspension portion;

said stack-welding being carried out at an edge of said suspension portion.

8. A method for manufacture, from thermoplastic synthetic plastic film, of bags such as carrying bags or the like packaging stacked and connected with one another through welding into a tear-off type pad, comprising the steps of:

providing a flattened film tube as a longitudinally advanced, continuous web comprising two layers of said film;

feeding said web longitudinally downwardly vertically to a welding device acting in a horizontal plane;

severing from said web sections corresponding to respective bags; stacking the severed sections successively into a pad stack; and stack-welding each section to the preceding section as it is added to the stack;

the stacking and welding of the bag sections to the stack being carried out at said device with a substantially vertical disposition of the bag sections.

9. A method as described in claim 8, including the step of:

supporting the leading individual bag section, during the downward advance of the web, in a substantially vertical plane, by air streams directed substantially vertically downwardly along opposite sides of the sections.

10. A method as described in claim 8 including the steps of:

maintaining the stack of sections being built up to a pad held vertically oriented in a stacking device, grasping the stack when finished as a desired pad in a clamping device and then releasing the pad from the stacking device, bringing the bag pad into conveying engagement upon a stationary conveyor belt, releasing the clamping device and starting the conveyor belt to carry the bag pad away.

11. A method as described in claim 10, including the further steps of:

drawing downwardly the released pad from the stacking device by means of the clamping device, then carrying out on the bag pad an operation providing therethrough perforations or apertures, before the pad is brought upon the conveyor belt.

12. A method for manufacture, from thermoplastic synthetic plastic film, of bags such as carrying bags or the like packaging stacked and connected with one another through welding into a tear-off type pad, comprising the steps of:

providing a wide flattened thermoplastic synthetic plastic film tube longitudinally advanced as a continuous web comprising two layers of said film;

making simultaneously a transverse perforation line in one film layer extending over the entire tube width repeatedly at spacings equal to the desired length of a bag with a suspension portion, and in the other layer, at a location coincident with each said transverse line, alternating aligned lengths of perforations and of severing cuts with lengths of perforations present in the edge marginal regions of the tube;

thereafter sub-dividing the tube into a plurality of narrower individual tube portions by longitudinal severing welds, made perpendicular to and in the middle region of non-marginal lengths of the said perforations;

thereafter severing the said individual tube portions into individual sections corresponding to respective bags with bottom seam welding, by a transversely running severing weld made at a spacing from the transverse line of perforations and severing cuts corresponding to a height of a desired bag suspension portion, whereby each section contains a bag portion and bag suspension portion; prior to the said sub-dividing of the tube, punching pad hanger holes through both layers of the tube along a line spaced from said location to fall within a respective bag suspension portion;

stacking the severed sections successively into a pad stack; and stack welding each section to the preceding section as it is added to the stack by a linear stack weld made at an edge of said suspension portion and extending over the entire width of the section.

13. A method for manufacture, from thermoplastic synthetic plastic film, of bags such as carrying bags or the like packaging stacked and connected with one another through welding into a tear-off type pad, comprising the steps of:

providing a flattened thermoplastic film tube, longitudinally advanced, as a continuous web comprising two layers of said film;

making repeatedly a web-separation perforation line transversely to, and penetrating through both film layers of, the tube;

along a line associated in close spacing behind each said perforation line, transversely seam-welding through both tube film layers, the spacing of each pair of associated lines from the preceding associated pair corresponding to the length of bag sections to be produced;

separating, from said web, sections corresponding to respective bags;

defining in each section, at least in part by perforations through the web, a bag suspension portion and a bag portion attached to and separable from the suspension portion at the said perforations;

stacking the separated sections successively into a pad stack; and stack-welding each section to the preceding section as it is added to the stack, the said stack-welding of each individual bag section into the bag pad being carried out by a continuous linear weld penetrating both film layers in the suspension portion and extending over the entire width of the section.

14. A method as described in claim 13, wherein the web separation perforation line is made together with the transverse seam-welding lying closely adjacent thereto in a single work operation.

15. A method for manufacture, from thermoplastic synthetic plastic film, of bags such as carrying bags or the like packaging stacked and connected with one another through welding into a tear-off type pad, comprising the steps of:

providing a flattened thermoplastic film tube longitudinally advanced, as a continuous web comprising two layers of said film; making through both tube film layers repeatedly along the web a first transverse perforation line as a line of bag tear-off from the pad and for the bag mouth, repeated at spacings along the web equal to the desired length of a bag with a suspension portion, a second perforation line as a web separation perforation line paired with the first in a spacing which corresponds to the height of a bag suspension portion, and, in close spacing behind the separation perforation line, a transverse bottom seam-welding through both film layers, with the paired perforation lines made at a spacing from a preceding transverse seam-welding which corresponds to the length of the bag to be produced;

separating, from said web, sections corresponding to respective bags;

stacking the separated sections successively into a pad stack; and stack-welding each section to the preceding section as it is added to the stack by a continuous linear weld extending over substantially the full width of the section and penetrating both film layers.

16. A method as described in claim 10, wherein said web having the two spaced paired perforation lines is fed vertically to a horizontally acting welding device for making the transverse seam-weld; and including the step of separating each bag section at the respective web-separation perforation line; and with a substantially vertical disposition of the separated bag section, effecting said stacking with stack-welding to a stacked pad at the suspension portion thereof.

17. A method as described in claim 15, wherein a separating cut is made in only one layer as the middle region of the tear-off perforation line.

18. A method as described in claim 15, wherein the paired adjacently spaced perforation lines are made in a single work operation.

19. A method as described in claim 15, wherein the adjacently disposed bag tear-off and web-separation perforation lines and the transverse seam-weld lying closely adjacent to the said separation perforation line are produced in a single work operation.

20. A method as described in claim 15, wherein two suspension holes are made through both tube film layers between each respective pair of web separation and bag tear off perforation lines.

21. A method for manufacture, from thermoplastic synthetic plastic film, of bags such as carrying bags or the like packaging stacked and connected with one another through welding into a tear-off type pad, comprising the steps of:

providing a flattened film tube having longitudinal side infolds, longitudinally advanced, as a continuous web comprising two layers of said film;

defining in each of successive like web sections, at least in part by perforations through the web, a bag suspension portion and a bag portion attached to and separable from the suspension portion at the perforations;

making, for each section, transversely aligned welds of limited lengths, in from both tube edges and perpendicularly thereto, and in the bag portion adjacent the bag suspension portion, through the four film layers present at the side infolded margins of the tube;

severing, from said web, sections corresponding to respective bags;

stacking the severed sections successively into a pad stack; and stack-welding each section to the preceding section as it is added to the stack, the stack-welding of the individual bag sections into a bag pad being made by linear welds penetrating all film layers in the suspension portion in the region near to the transverse welds of limited lengths.

22. A method as described in claim 21, wherein the bag sections are stack-welded with each other in the area between the side infolds at the line of the transverse welds of limited lengths.

23. A method as described in claim 21, wherein at a spacing from the transverse welds of limited length, which spacing corresponds to the heights of a bag suspension portion, there is produced a transverse perforation line through the tube in combination with a transverse seam welding extending over the entire tube width, with the said perforation line made adjacent that side of the seam welding toward the welds of limited length.

24. A method as described in claim 23, including the further step of:

making a transverse bag tear-off perforation line through and extending over the entire width of the tube at a location which, relative to the advance of the tube, is adjacently behind the welds of limited length.

25. A method as described in claim 21, including the further steps of:

in the region between the welds of limited length and beyond the latter in the direction towards which the tube advances, producing a rectangularly broad U-shaped cut through the tube with the legs of the U-shape directed back toward but terminating short of the limited length welds, and making perforation cuts as elongations of the legs up to the said welds;

the said U-shaped cut overlapping the inner margins of the side infolds;

the severing of each section from the web being effected along a transverse line immediately behind the welds of limited length.

26. A method as described in claim 25, wherein the U-shaped cut is closed upon itself along a line forward of said welds thereby to produce an approximately rectangular window-like cut-out through the tube and with lateral ends overlapping the inner margins of the side infolds, and a suspension portion rearwardly of the cut-out.

27. A method as described in claim 25, wherein the said U-shaped cut is carried out simultaneously on all bag sections after connection into a single pad of desired thickness.

28. A method as described in claim 21, including the further steps of:
perforating the web along a transverse line immediately behind, and with sets of perforations at least coextensive with, the welds of limited length; and
in the region between the welds of limited length and beyond the latter in the direction towards which the web advances, producing a broad rectangularly shaped cut-out through the tube with narrow lateral ends overlapping the inner margins of the side infolds and a trailing long side coinciding with the transverse line of the perforations;
the severance of each section from the web being effected along a transverse line behind the respective transverse line of perforations by a spacing defining the height of a bag suspension portion in the section.

29. A method for manufacture, from thermoplastic synthetic plastic film, of bags such as carrying bags or the like packaging stacked and connected with one another through welding into a tear-off type pad, comprising the steps of:
providing a flattened film tube, longitudinally advanced, as a continuous web comprising two layers of said film;
transversely severing, from the web, sections corresponding to respective bags and
each comprising a bag portion with length extending longitudinally of the tube end of the respective section, the section lengths each comprising a bag portion and a bag suspension portion;
prior to the separation of each respective bag section from the web, in successive spacings corresponding to the length of the bag with the suspension portion, making in the tube a transverse bag tear off perforation line and forwardly adjacent thereto a seaming transverse weld of the said layers;
each successive section being severed from the web at a location spaced behind a respective transverse perforation line at a distance equal to the height of, and thereby defining the suspension portion of, the section;
stacking the severed sections successively into a pad stack; and
stack-welding each section to the preceding section as it is added to the stack;
said stack welding being effected by a continuous linear weld penetrating both film layers in the suspension portion of each section and extending over the entire width of the section.

30. A method as described in claim 29, wherein suspension aperture production is effected through the tube in back of the transverse perforation line.

31. A method as described in claim 30, wherein a further transverse welding is produced in back of the suspension aperture location with the spacing of the further transverse welding from the first transverse welding being slightly greater than the height of the suspension portion.

32. A method as described in claim 29, wherein after stacking of the bag sections into the pad there is punched out through the pad end opposite to the suspension portion end, an endwise-opening cut out.

33. A method as described in claim 32, wherein the punch out operation is effected at a stacking station.

34. A method as described in claim 30, wherein the transverse perforation line, the transverse welding and the suspension aperture production are effected in a single operation.

35. A method as described in claim 30, wherein a further transverse welding is produced in back of the suspension aperture location; with the spacing of the further transverse welding from the first transverse welding being slightly greater than the height of the suspension portion; and after stacking of the bag sections into the pad there is punched out through the pad end opposite to the suspension portion end, an endwise-opening cut-out.

36. A method as described in claim 31, wherein said further transverse welding serves simultaneously to sever the respective bag section from the web.

37. A method as described in claim 31, wherein the severance of the web is effected adjacently to the location of the further transverse welding and on the forward side toward the aperture location.

38. A method for manufacture, from thermoplastic synthetic plastic film, of bags such as carrying bags or the like packaging stacked and connected with one another through welding into a tear-off type pad, comprising the steps of:
providing a flattened film tube as a longitudinally advanced, continuous web comprising two layers of said film;
feeding said web longitudinally to a welding device;
severing, from said web, sections corresponding to respective bags;
stacking the severed sections successively into a pad stack; and
stack-welding each section to the preceding section as it is added to the stack
with the sections being welded at, or in the region of, respective like edges,
the stack-welding of each bag section to the stack being effected by a continuous linear weld extending over the major part of the full width of, and penetrating both film layers of, each bag section.

39. A method as described in claim 38, including the step of punching in said sections a pair of pad hanging holes located on a line spaced inward from and parallel to the said linear weld.

40. A method as described in claim 39, wherein each section is transversely perforated across its entire width at a line inward of said holes to form a tear-off perforation line dividing each section into a bag suspension portion and a bag portion;
whereby the said linear weld and holes occur in the bag suspension portion of each section in the resultant pad.

* * * * *